Patented Aug. 10, 1954

2,686,188

UNITED STATES PATENT OFFICE 2,686,188

21-CHLOROPREGNANE-11,20-DIONE-3α,17α-DIOL AND PROCESS

William S. Johnson, Madison, Wis., and Raymond O. Clinton, North Greenbush, N. Y., assignors to Sterling Drug Inc., New York, N. Y., a corporation of Delaware No Drawing. Application May 12, 1953, Serial No. 354,642

4 Claims. (Cl. 260—397.45)

This invention relates to a process for preparing 21-chlorosteroids and to certain new products produced thereby.

The new process comprises causing a 17-hydroxy-17-aceto-steroid to react with sulfuryl chloride and isolating the resulting 17-hydroxy-17-chloroaceto-steroid. The reaction takes place by simple admixture of the reactants in an inert organic solvent at room temperature or below. Heating is therefore unnecessary and is preferably avoided in order to prevent deleterious side reactions at susceptible parts of the steroid molecule, as, for example, the 17-hydroxy group. The inert organic solvent is one which will not react appreciably with sulfuryl chloride at room temperature or below. Appropriate solvents are readily evident to the skilled chemist; cf. "Sulfuryl Chloride in Organic Chemistry" by H. C. Brown, Ind. Eng. Chem. 36, 785–91 (1944). Halohydrocarbons such as chloroform and carbon tetrachloride are particularly valuable since the sulfuryl chloride is stable therein.

This process provides a method for the introduction of a functional group in the 21-position of steroids characteristic of the adrenal cortical hormones. For example, a nuclearly saturated 17-hydroxy-17-aceto-11-keto-3-hydroxy-steroid and sulfuryl chloride react to produce a nuclearly saturated 17-hydroxy-17-chloroaceto-11-keto-3-hydroxy-steroid. A particularly useful instance is the case where the starting material is pregnane-11,20-dione-3,17α-diol which reacts with sulfuryl chloride to give 21-chloropregnane-11,20-dione-3,17α-diol which in turn is readily converted in a few steps to the important hormone known as cortisone. This is accomplished by oxidizing 21-chloropregnane-11,20-dione-3,17α-diol to 21-chloropregnan-17α-ol-3,11,20-trione, halogenating the latter to produce 4-halo-21-chloropregnan-17α-ol-3,11,20-trione, treating the 4-halo-21-chloropregnan-17α-ol-3,11,20-trione with hydrazine or a substituted hydrazine to remove the elements of hydrogen halide from the 4- and 5-positions, hydrolyzing the resulting hydrazone of 21-chloro-4-pregnen-17α-ol-3,11,20-trione to 21-chloro-4-pregnen-17α-ol-3,11,20-trione, and treating the latter with a metallic acetate to produce cortisone acetate. The 21-chloropregnan-17α-ol-3,11,20-trione and 4-halo-21-chloropregnan-17α-ol-3,11,20-triones and their preparation are described in the prior copending applications of R. O. Clinton, Serial Nos. 259,510, filed December 1, 1951, now abandoned and 285,069, filed April 29, 1952. The present application is a continuation-in-part of W. S. Johnson and R. O. Clinton application, Serial No. 253,012, filed October 24, 1951, now abandoned.

Other steroids having the 17-hydroxy-17-aceto grouping can be used in the new process. They can belong to either the "normal" or "allo" series and they can possess one or more double bonds in the nucleus as well as one or more substituents such as keto, halogen, hydroxy, esterified hydroxy and etherified hydroxy groups. For example, appropriate starting materials are pregnane-3β,17α-diol-20-one (Reichstein's L), 17-hydroxyprogesterone, pregnane-3,11,20-trione-17α-ol and Δ⁴-pregnene-3,11,20-trione-17α-ol. When a plurality of keto groups are present in the steroid nucleus, additional chlorine atoms may be introduced by the action of the sulfuryl chloride, in which case an excess of sulfuryl chloride may be needed to complete the chlorination of the 21-position.

The following examples will further illustrate the invention:

*Example 1*

Twenty drops of sulfuryl chloride solution (83.3 mg./cc. in carbon tetrachloride) was added to a stirred solution of 20.0 g. (0.056 mole) of pregnane-3α,17α-diol-11,20-dione in 280 cc. of chloroform under anhydrous conditions. After ten minutes sulfuryl chloride solution was added dropwise over a period of one hour at room temperature until a total of 7.76 g. (0.056 mole, 92.8 cc. of 83.3 mg./cc. SO₂Cl₂ in CCl₄) of sulfuryl chloride had been added (including the original twenty drops). The reaction mixture was stirred for ten minutes, washed with 400 cc. of water, 400 cc. of sodium bicarbonate solution and 400 cc. of 5% sodium chloride solution. The combined aqueous washings were extracted with chloroform and then with ethyl acetate. The combined organic layers were dried over anhydrous sodium sulfate and concentrated. The residue was stirred with ether and the crystalline product was collected by filtration and dried at 50° C. for three hours giving 17.95 g. of 21-chloropregnane-3α,17α-diol-11,20-dione, M. P. 174–177° C.

When a slight excess of sulfuryl chloride, about 30%, is used, a product is obtained which can readily be purified by recrystallization from acetone-ether to give 21-chloropregnane-3α,17α-diol-11,20-dione melting at about 195° C. with an optical rotation $[\alpha]_D^{25} = +84°$ (1% in CHCl₃). The substance melting at about 195° C. when boiled with benzene is converted to another crystalline form of the same substance melting at 215–216° C. and having the same optical rotation.

21-chloropregnane-3α,17α-diol - 11,20 - dione has the following structural formula:

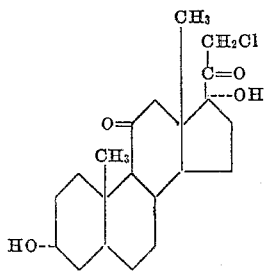

Example 2

Twenty drops of sulfuryl chloride solution (83.3 mg./cc. in carbon tetrachloride) was added to a stirred solution of 5.0 g. (0.0144 mole) of pregnane-3α,17α-diol-11,20-dione in 70 cc. of chloroform under anhydrous conditions at 0° C. After ten minutes sulfuryl chloride solution was added dropwise over a period of twenty minutes until a total of 1.94 g. (0.0144 mole, 23.2 cc. of 83.3 mg./cc. SO₂Cl₂ in CCl₄) of sulfuryl chloride had been added (including the original twenty drops). The reaction mixture was stirred for seventy minutes at 0° C., washed with 100 cc. of water, 100 cc. of saturated sodium bicarbonate solution and 100 cc. of water. The aqueous washings were extracted with chloroform and then with ethyl acetate. The combined organic layers were dried over anhydrous sodium sulfate and concentrated. The residue gave 3.70 g. of 21-chloropregnane-3α,17α-diol-11,20-dione.

Example 3

Pregnane-3α,17α-diol-11,20-dione (5.0 g.) was treated with 1.94 g. of sulfuryl chloride according to the method described in Example 1 except that the chloroform was replaced by 50 cc. of glacial acetic acid. The reaction mixture was worked up as described in Example 1 except that the sodium bicarbonate solution was replaced by 5% sodium hydroxide solution. In this way there was obtained 3.46 g. of 21-chloropregnane-3α,17α-diol-11,20-dione.

Example 4

Pregnane-3α,17α-diol-11,20-dione (10 g.) was treated with 3.88 g. of sulfuryl chloride according to the method described in Example 1 except that the chloroform was replaced with 100 cc. of dioxane. In this case 4.94 g. of 21-cholorpregnane-3α,17α-diol-11,20-dione was obtained.

By the methods described in the preceding examples, 3α-acetoxy-pregnane-11,20-dione-17α-ol can be caused to react with sulfuryl chloride to give 3α-acetoxy-21-chloropregnane-11,20-dione-17α-ol. Similarly other 3-monoesters of pregnane-11,20-dione-3α,17α-diol can be chlorinated in the 21-position by reaction with sulfuryl chloride. These 3-monoesters can be lower-aliphatic carboxylic acid esters, RCOOH, where R is hydrogen or a lower-alkyl group, such as the formate, propionate or butyrate; lower-aliphatic dicarboxylic acid esters, R'(COOH)₂, where R' is a lower-alkylene group, such as the acid succinate; or monocyclic aromatic carboxylic acid esters, such as the benzoate, 4-nitrobenzoate and 3,5-dinitrobenzoate.

By the methods described in the examples, pregnane-3β,17α-diol-20-one can be caused to react with sulfuryl chloride to give 21-chloro-pregnane-3β,17α-diol-20-one.

We claim:

1. The process which comprises mixing a 17-hydroxy-17-aceto-steroid and at least an equimolar quantity of sulfuryl chloride in an inert organic solvent, and isolating the resulting 17-hydroxy-17-chloroaceto-steroid.

2. The process which comprises mixing pregnane-11,20-dione-3α,17α-diol and at least an equimolar quantity of sulfuryl chloride in an inert organic solvent, and isolating the resulting 21-chloropregnane-11,20-dione-3α,17α-diol.

3. A compound selected from the group consisting of a nuclearly saturated 17-hydroxy-17-chloroaceto-steroid having as additional nuclear substituents a 3-hydroxy group and an 11-keto group, and 3-carboxylic acid esters thereof derived from acids selected from the group consisting RCOOH, R'(COOH)₂, and monocyclic aromatic carboxylic acids, wherein R is a member of the class consisting of hydrogen and lower-alkyl groups and R' is a lower-alkylene group.

4. 21 - chloropregnane - 11,20 - dione - 3α,17α-diol having the formula

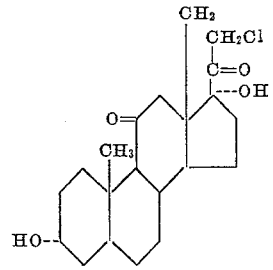

No references cited.